Patented May 13, 1952

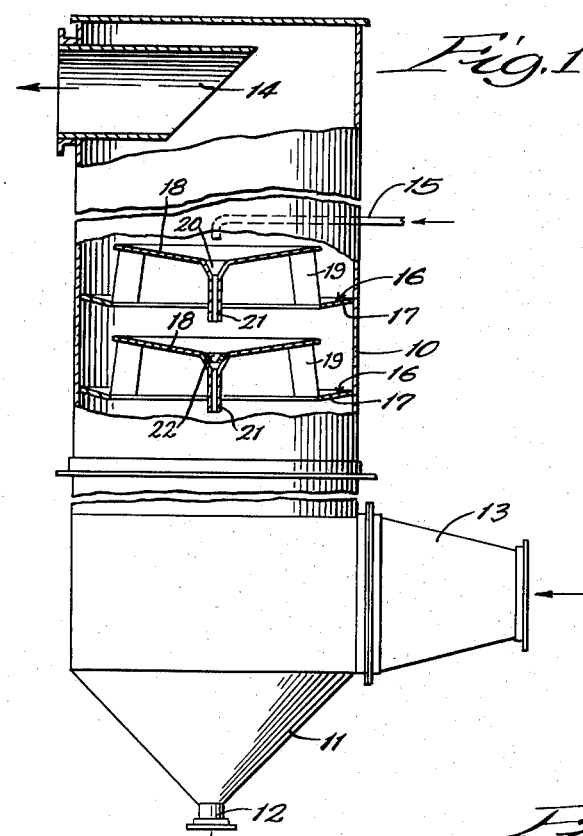
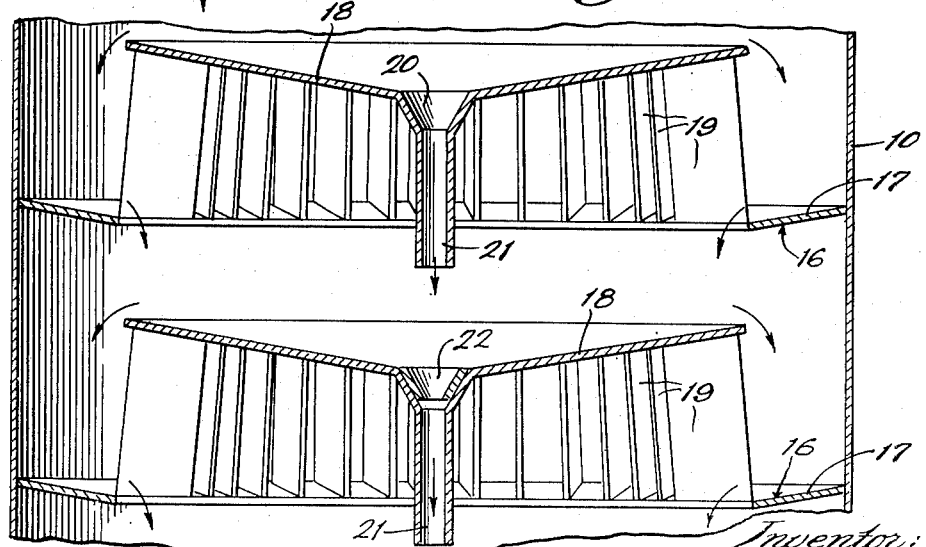

2,596,105

UNITED STATES PATENT OFFICE 2,596,105

COLUMN APPARATUS

Claude B. Schneible, Detroit, Mich.

Application November 22, 1947, Serial No. 787,534

7 Claims. (Cl. 261—79)

This invention relates to column apparatus, and more particularly to intimate contact equipment for the purpose of creating an intimate contact between liquid and gas, or vapor, or both.

In columns and towers heretofore used in which a liquid was passed countercurrent to gases or vapors, considerable difficulty was experienced in thoroughly contacting a large amount of liquid. The liquid, in such prior practice, meeting the rotating annulus of gas or vapor, was broken into fine particles or atomized to create an intimate contact. The liquid volume is therefore restricted by the atomizing ability of the gas or vapor. At a low gas (vapor) velocity, the atomization is not satisfactory, and at too high a velocity, the entrainment is too great. There is, therefore, a fixed relation between the weight of the liquid and the velocity of the gas or vapor.

In apparatus in which the gases or vapors are rotated in passing through the apparatus and in meeting the liquid, greater difficulty is experienced in by-passing liquid downwardly and outside of the rotating annulus. This difficulty is due to the fact that the rotating annulus exerts a centrifugal action and tends to pick up liquid along the side walls of the column.

Practice shows that, in many applications, it is desirable to circulate a greater quantity of liquid than the apparatus can atomize, and it is one object of this invention to provide apparatus capable of circulating such greater quantity of liquid. A further object is to provide a structure in which the by-pass for the liquid causes the liquid to pass through the central portion of the rotating annulus. A further object is to provide apparatus in which liquid is brought into intimate contact with gases or vapor, while at the same time providing means for circulating liquid through the apparatus which is greater than the apparatus can atomize. A still further object is to provide means for passing an excess of liquid downwardly through the column in a quantity greater than the apparatus can atomize, while at the same time bringing the liquid in at lower spaced points at which the liquid is finally atomized. Yet another object is to provide apparatus in which the amount of liquid by-passed from the atomization zones can be effectively controlled or regulated. A still further object is to provide means whereby a body of liquid is provided in quantity at different stages throughout a column for the purpose of diluting the liquid being atomized and for preventing crystallization of acids, alkalies, and other materials. Other specific objects and advantages will appear as the specification proceeds.

The invention is illustrated, in a preferred embodiment, by the accompanying drawing, in which—

Figure 1 is a broken vertical sectional view of apparatus embodying my invention; and Fig. 2, an enlarged broken vertical sectional view.

In the illustration given, 10 designates a casing providing an elongated vertical chamber. The casing is provided at its bottom with a conical outlet portion 11 and with an outlet pipe 12. An inlet pipe 13 for the incoming gases or vapors is provided, and the inlet is preferably tangential to the cylindrical body of the casing, as shown more clearly in my Patent No. 2,114,786, dated April 19, 1938.

The casing is also provided at the top with an outlet pipe 14. A liquid pipe 15 is employed for introducing water or other liquid into the interior of the chamber.

Within the casing 10, I provide a number of baffles 16 over which the water has flowed. In the specific illustration given, each baffle comprises a ring 17, plate 18, and vanes 19 between the ring and plate, all as shown in greater detail in my said Patent No. 2,114,786. The vanes 19 are inclined so that as the gases or vapors are drawn upwardly under suction, the gases or vapors are caused to form a rotating annulus in the area around and above the vanes. The descending liquid is broken into fine particles by contact with the rotating annulus.

In the illustration given, the plates 18 are dished and are provided centrally with openings 20. Depending from the plates 18 are discharge pipes 21.

It will be understood that any suitable bypass means may be employed for bringing liquid outside of the atomization area and to reach the plates below. In a structure of the character described, a greater number of baffles are ordinarily employed, and it is desired to by-pass liquid outside of the rotating gaseous body so as to reach the lower portions of the column. The structure shown is advantageous in that the liquid is by-passed centrally of the rotating gas columns or rings, and thus some is able to reach lower portions of the apparatus. Of course, some of the liquid passed thus centrally through the baffles will be drawn by the ascending gas into the rotating gas masses, but a substantial portion is able, by the means shown, to reach effectively lower portions of the column.

In the operation of the apparatus, the gaseous material being treated passes through the inlet 13, which is preferably located tangentially to the column 10, and passes up through the column forming a rotating gaseous body. The gas, passing through each baffle, strikes the inclined vanes 19 therein and is given a rotating movement so that about each of the baffles an effective annulus of gas is provided. This rotating body of gas on striking the liquid tends to atomize it and thus provides an intimate contact between the gas and the liquid.

Liquid, such as water, oil, solvent, acid, alkali solutions, or any other treating fluid that is to be used, enters through pipe 15, as shown in Fig. 1, and is discharged downwardly through its outlet upon the top of the plate 18 below. Such liquid will spill over the edges of the plate and meet the rising vapors or gases passing through the vanes 19. A portion of the liquid, however, passes downwardly through the by-pass pipe 21 onto the plate below. In this manner, liquid is passed into the lower portion of the apparatus without being subjected to atomization and is available for atomization in the lowermost plates or on the deflector plate in the very bottom of the apparatus.

In the operation of the structure for treating various liquids or gases, it will be desirable to control the volume of liquid on each plate. In Fig. 2 is shown a plug 22 which reduces the diameter of the outlet opening and thus insures that, on the plate in which it is located, a lesser quantity of liquid will pass through the outlet pipe 21 and a correspondingly greater quantity will pass over the edge of this plate. It will be understood that the control plugs 22 may be used on all of the openings, or on some of them, or on only a part of them, depending upon the desired amount of liquid which is to be by-passed with respect to each particular plate. Further, it will be understood that the plug employed is merely illustrative of one of many mechanical means which may be used for controlling the quantity of liquid passing through the plate.

It will further be understood that the plates 18 may be of any desired configuration, being convex or concave in accordance with the need for liquid to be supplied to the lower plates.

In the foregoing operation, it will be understood that the inlet pipe 13 is connected to a conduit leading from a source of gas (vapor), and that the outlet pipe 14 is connected to a conduit leading to an exhaust blower, etc. If desired, however, the gas may be passed through the column by means of pressure rather than by suction. It will be understood that the drain outlet pipe 12 is connected to a conduit which may be closed or which may lead to a separator or other container.

The apparatus is highly effective for the treatment of chemical gases or vapors, and liquids, or for fines collecting, and, in fact, for any operation in which it is desired to have a liquid make intimate contact with gases.

By the term "gas" or "gases," as used herein and in the accompanying claims, I intend to employ the term in its broader meaning to include vapors as well as gases.

While in the foregoing specification I have set forth a specific structure in considerable detail for the purpose of illustrating one mode of carrying out the invention, it will be understood that such details may be varied widely by those skilled in the art without departing from the spirit of my invention.

I claim:

1. In apparatus for producing an intimate contact between liquids and gases wherein a gas is caused to move upwardly in a rotating spiral having a rarefied core to atomize a downwardly flowing liquid, a column providing a vertical chamber, baffles spaced apart in said chamber and comprising spaced rings, plates, and inclined vanes between the rings and plates, and means for discharging liquid onto the plate of at least one of said baffles, and at least some of said plates having a central opening adapted to discharge a portion of said liquid onto the plate below through the rarefied core of said rotating gas spiral, the structural elements within said vertical chamber being arranged to provide an open path of communication extending in a continuous vertical line from said central opening to the plate immediately therebelow, whereby said liquid portion passes downwardly without being atomized by said gas.

2. In apparatus for producing an intimate contact between liquids and gases wherein a gas is caused to move upwardly in a rotating spiral having a rarefied core to atomize a downwardly flowing liquid, a column providing a vertical chamber, baffles spaced apart in said chamber and comprising spaced rings, plates, and inclined vanes between the rings and plates, and means for discharging liquid onto the plate of at least one of said baffles, said plate being dished downwardly and having a central opening in direct communication with the plate below through the rarefied core of said rotating gas spiral, the structural elements within said vertical chamber being arranged to provide an open path of communication extending in a continuous vertical line from said central opening to the plate immediately therebelow, whereby a portion of the liquid is passed downwardly to the plate below without being atomized by said gas.

3. In apparatus for producing an intimate contact between liquids and gases wherein a gas is caused to move upwardly in a rotating spiral having a rarefied core to atomize a downwardly flowing liquid, a column providing a vertical chamber, baffles spaced apart in said chamber and comprising spaced rings, plates, and inclined vanes between the rings and plates, and means for discharging liquid onto the plate of at least one of said baffles, said plate having a central discharge pipe extending downwardly through the rarefied core of said rotating gas spiral, whereby a portion of said liquid is discharged downwardly onto a lower plate without being atomized by said gas.

4. In apparatus for producing an intimate contact between liquids and gases wherein a gas is caused to move upwardly in a rotating spiral having a rarefied core to atomize a downwardly flowing liquid, a column providing a vertical chamber, baffles spaced apart in said chamber and comprising spaced rings, plates, and inclined vanes between the rings and plates, and means for discharging liquid onto the plate of at least one of said baffles, some of said plates having a central opening and an outlet tube directing liquid downwardly onto the center of the plate below through the rarefied core of said rotating gas spiral, whereby a portion of said liquid is passed downwardly to the plate below without being atomized by said gas.

5. In apparatus for producing an intimate contact between liquids and gases wherein a gas is caused to move upwardly in a rotating spiral having a rarefied core to atomize a downwardly flowing liquid, a casing providing a vertical chamber and being provided at its bottom with a draw-off pipe and laterally of its bottom with an inlet, said casing being also provided in its upper portion with an outlet, a plurality of baffles in said column and in spaced-apart relation, said baffles being provided with inclined vanes for rotating the gas, means for passing a liquid onto one of the upper baffles, and means for passing gas through said inlet and upwardly through the vanes of said baffles to form a rotating annulus, at least the uppermost of said baffles each being provided with a central discharge opening and having a downwardly extending conduit means connected to said central opening for discharging a portion of said liquid onto the plate immediately therebelow through the rarefied core of said rotating gas spiral, whereby a portion of said liquid is discharged downwardly without being atomized by said gas.

6. In apparatus for producing an intimate contact between liquids and gases wherein a gas is caused to move upwardly in a rotating spiral having a rarefied core to atomize a downwardly flowing liquid, a casing providing a vertical chamber and being provided at its bottom with a draw-off pipe and laterally of its bottom with a tangential inlet, said casing being also provided in its upper portion with an outlet, a plurality of baffles in said column and in spaced-apart relation, said baffles being provided with inclined vanes for rotating the gas, means for passing a liquid onto one of the upper baffles, and means for passing gas through said inlet and upwardly through the vanes of said baffles to form a rotating annulus, at least the uppermost of said baffles being provided centrally with a discharge pipe extending downwardly through the rarefied core of said rotating gas spiral, whereby a portion of said liquid is passed downwardly onto the plate below without being atomized by said gas.

7. In apparatus for producing an intimate contact between liquids and gases wherein a gas is caused to move upwardly in a rotating spiral having a rarefied core to atomize a downwardly flowing liquid, a casing providing a vertical chamber and being provided at its bottom with a draw-off pipe and laterally of its bottom with a tangential inlet, said casing being also provided in its upper portion with an outlet, a plurality of baffles in said column and in spaced-apart relation, said baffles being provided with inclined vanes for rotating the gas, means for passing a liquid onto one of the upper baffles, at least some of the upper baffles each being provided with a central opening and having a downwardly extending conduit means connected to said central opening for discharging a portion of said liquid onto the plate immediately therebelow through the rarefied core of said rotating gas spiral, whereby a portion of said liquid is discharged downwardly onto the plate below without being atomized by said gas.

CLAUDE B. SCHNEIBLE.

REFERENCES CITED

The following references are of record in the file of this patent:

UNITED STATES PATENTS

| Number | Name | Date |
|---|---|---|
| 921,365 | Clarkson | May 11, 1909 |
| 1,471,101 | Cleary | Oct. 16, 1923 |
| 1,783,813 | Schneible | Dec. 2, 1930 |
| 1,894,744 | Hawley | Jan. 17, 1933 |
| 1,922,259 | Paradise | Aug. 15, 1933 |
| 2,078,288 | Sherman | Apr. 27, 1937 |
| 2,354,674 | Fisher | Aug. 1, 1944 |

FOREIGN PATENTS

| Number | Country | Date |
|---|---|---|
| 290,553 | Great Britain | May 10, 1928 |